United States Patent
Rao et al.

(10) Patent No.: US 7,291,199 B2
(45) Date of Patent: Nov. 6, 2007

(54) PROCESS FOR THE PRODUCTION OF A PLANT GROWTH STIMULATOR FROM FLY ASH

(75) Inventors: Sukuru Ramakrishna Rao, Jharkhand (IN); Swapan Kumar Ghosh, Jharkhand (IN); Gulab Singh, Jharkhand (IN); Sushanta Kumar Hazra, Jharkhand (IN)

(73) Assignee: Council of Scientific and Industrial Research, New Delhi (IN)

( * ) Notice: Subject to any disclaimer, the term of this patent is extended or adjusted under 35 U.S.C. 154(b) by 738 days.

(21) Appl. No.: 10/795,576

(22) Filed: Mar. 8, 2004

(65) Prior Publication Data
US 2004/0250581 A1 Dec. 16, 2004

Related U.S. Application Data

(63) Continuation of application No. PCT/IN03/00063, filed on Mar. 20, 2003.

(51) Int. Cl.
*C05F 11/00* (2006.01)
*C05F 7/00* (2006.01)

(52) U.S. Cl. .................... 71/25; 71/47; 71/49; 504/113
(58) Field of Classification Search ............... None
See application file for complete search history.

(56) References Cited

U.S. PATENT DOCUMENTS 4,915,920 A 4/1990 Kobayashi

FOREIGN PATENT DOCUMENTS

GB 424260 * 2/1935

* cited by examiner

*Primary Examiner*—Cecilia Tsang
*Assistant Examiner*—Kristie L Brooks
(74) *Attorney, Agent, or Firm*—Ladas and Parry LLP

(57) ABSTRACT

The invention relates to a process for the production of plant growth stimulator from fly ash, comprising treating fly ash with effluent NOx gases in a reactor under agitation at a temperature in the range of 60 to 100 degree celsius, for a time period in the range of 2 to 5 hours and treating the resulting material with effluent ammonia gas in the same reactor under ambient conditions for time period in the range of 20 to 50 minutes.

7 Claims, No Drawings

PROCESS FOR THE PRODUCTION OF A PLANT GROWTH STIMULATOR FROM FLY ASH

This application is a continuation of copending International Application PCT/IN03/00063 filed on Mar. 20, 2003, which designated in the U.S., claims the benefit thereof and incorporates the same by reference.

The present invention relates to a process for the production of a plant growth stimulator from fly ash. The treated fly ash finds agricultural usage such as plant growth stimulator.

Fly ash a primary product of coal utilisation, is obtained as a fine particulate mineral residue, left behind after all combustibles in coal are burnt out. Its current output rate from steam raising and other plants utilising pulverised coal, is about 10 metric tonnes per annum. Its accumulation without adequate avenues for consumption or disposal otherwise, creates firstly the problem of space for its storage. Secondly, air polluted by its silica particles of less than 10 microns size emitted by boiler chimneys or carried away by prevailing winds from open heaps, causes breathing trouble to human beings. There is a pressing need felt by planners and operators of power stations, to search new areas of its usage, so that the twin problems of its storage and pollution could be mitigated to a considerable extent. Having no easy solution for transportation to outskirts, it is being piled up everyday.

The subject of the invention is a process for the production of plant growth stimulator from fly ash.

Fly Ash is a valuable substance which provides for the proper growth of plants. It consists of the inorganic mineral constituents in the coal and some organic matter which is not wholly burned. The inorganic mineral constituents, whose residue is ash, make up from 3% to 30% of the coal. During combustion, this ash is distributed into to parts; bottom ash collected from the bottom of the boiler unit, also sometimes referred to as bed ash or boiler slag, and fly ash, most of which is collected by air pollution control equipment. Fly ash makes up from 10% to 85% of the coal ash residue and occurs as spherical particles, usually ranging in diameter from 0.5 to 100 microns. The bottom ash, composed primarily of coarser, heavier particles than fly ash, ranges from gray to black in colour and is generally angular with a porous surface. The distribution of ash between the bottom and fly ash fraction is a function of the boiler type, coal type and whether or not a wet or dry bottom furnace was used. Fly ash contains many of the minor and micro nutrients needed for effective plant growth. There are fourteen mineral elements which are essential to the growth of some plant or plants; calcium, magnesium, potassium, iron, manganese, molybdenum, copper, boron, zinc, chlorine, sodium, cobalt, vanadium and silicone. while all are not required for all plants, all have been found to be essential to some. These mineral elements, in addition to phosphorous and sulphur, usually constitute what is known as the plant ash, or minerals remaining after the burning off of carbon, hydrogen, oxygen and nitrogen. The chemical elements nitrogen, phosphorous and potassium are known as macro-nutrients, which are required in the greatest quantity. Sulphur, calcium and magnesium, called secondary elements, are also necessary to the health and growth of vegetation, but they are required in lesser quantities compared to the macro-nutrients. The other elements of agronomic importance, provided for plant ingestion in small (or trace) amounts, include boron, cobalt, copper, iron, manganese, molybdenum and zinc. These minor elements are called micro-nutrients. If one compares the elements found in coal ash residues to the list of elements required for plant nutrition, one finds considerable overlap. When comparing the elements of coal ash residues and the required elements for plant growth, it is found that sufficient quantity of nitrogen is not available in fly ash residues. To achieve an effective plant growth stimulant, it is necessary to transform some of the elements found in fly ash into desirable chemical moieties. The constituents of fly ash, however complete, must be in the form in which in which plants can use them. The mere presence of particular chemical elements in the soil is not enough. The problem of maintaining optimum growing conditions is to have the essential elements not only present, but in a form readily available to each plant's requirements. Fly ash contains lot of important minerals in insoluble form; thereby they are of no use to the soil. By treating with effluent NOx gases these minerals gets nitrated which are soluble and readily available to the soil.

Reference may be made to U.S. Pat. No. 5,451,240 wherein activated humic acid bearing ores are combined with coal ash to provide a composition with plant growth stimulator abilities. However, it consists of several complex steps using several chemicals. First the fly ash is hydrated by water spaying onto the ash in a large mixer. While water is added, the mixture is stirred for about 20-30 minutes. After the ash and the water have been thoroughly mixed, the mixture is transferred to a holding unit, where heat is generated. The mixture is then allowed to cool down. The entire hydration process takes about 24 hours. It is at this point where the activated leonardite ore and the hydrated fly ash are preferably combined. However, the heat of hydration then must be dissipated without allowing an excess temperature rise in the leonardite ore, which would negatively affect the proper formation of a prill. Preferably, the activated ore and the hydrated ash are combined in a 50:50 weight to weight ratio. Then the dry mixture of activated leonardite ore and hydrated fly ash are binded through a liquid binding agent. The binder is a solution of potassium hydroxide and aqueous ammonia.

Reference may be made to U.S. Pat. No. 5,482,528 wherein solid waste such as sewage sludge containing fecal matter is processed to reduce pathogens and converted to a useful product such as an amendment to agricultural land by combining the waste with an acid such as concentrated sulphuric acid and a base such as fly ash which exothermically react and thermally pasteurize the waste and add mineral value to the product. Pazzolanic materials, such as fly ash agglomerate the product and after grinding, the particles can aerate soil. The calcium oxide in fly ash reacts with sulphuric acid to form calcium sulphate dihydrate, a soil amendment. This invention relates to combining sludge or other waste with heat generating treatment chemicals that pasteurize the waste and convert to a soil amendment or fertiliser.

Reference may also be made to U.S. Pat. No. 5,468,276 wherein a process for producing a fertiliser which incorporates fly ash with an organic fertilising component comprising manure. The fly ash and manure are mixed with the resulting mixture compressed by passing the mixture through a roller press thereby forming a sheet and fracturing the sheet into chips or other particulate form. The water content of the mixture is controlled in an effort to produce particulates having high dry strength.

The drawbacks of the above processes are that in no case fly ash was used as main substrate. In fact, it was used as one of the ingredients.

The main objective of the present invention is to provide a process for the production of plant growth stimulator from fly ash which obviates the drawbacks as detailed above.

Another objective of the present invention is to utilise effluent gases from nitric acid and ammonia plants.

One Stainless Steel Reactor (500-700 gms per batch) with mechanical device for intimate and uniform gas-solid contact and temperature and gas flow controls have been designed, fabricated and installed near the tail gas vent line Nitric Acid Plant. Since the flow rate of tail gas (about 10000 cubic nanometers/hour) and concentration of NOx (about 0.04% in terms of NO) are steady. The reaction parameters can be more effectively controlled which results in higher conversion to desired product with consistent characteristics. The NOx treated product in the reactor is taken to ammonia gas plant wherein the effluent ammonia gas, having concentration of 0.01% and flow rate of about 3000 cubic nanometers per hour, is made to react with the nitrated product.

Accordingly the present invention provides a process for the production of plant growth stimulator from fly ash, which comprises treating fly ash with effluent NOx gases in a reactor under agitation at a temperature in the range of 60 to 100 degree Celsius, for a time period in the range of 2 to 5 hours, treating the resulting material with effluent ammonia gas in the same reactor under ambient conditions for time period in the range of 20 to 50 minutes.

In an embodiment of the present invention the concentration of stream of NOx gases may be in the range of 0.04 to 0.05% (in terms of NO) by mixing air, if required.

In another embodiment of the present invention the concentration of stream of ammonia gas may be in the range of 0.01 to 0.02% by mixing with air, if required.

The invention primarily relates to a process for production of plant growth stimulator which is of free flowing nature, by treatment of fly ash with effluent gases from nitric acid and ammonia plants, which are otherwise vented to the atmosphere polluting the same. The yield of crop production is sufficiently high.

The novelty of the process of the invention resides in the agricultural use of waste and polluting products such as fly ash, effluent NOx and ammonia gases. The inventive steps comprises the treatment of fly ash with effluent NOx and ammonia gases from nitric acid and ammonia gas plants.

The following examples are given by way of illustration and therefore should not be construed to limit the scope of the present invention.

EXAMPLE-1

500 gms of fly ash was taken in the Stainless Steel Reactor (with mechanical device for intimate and uniform gas-solid contact and temperature and gas flow controls) which was installed near the tail gas vent line Nitric Acid Plant. made to contact with effluent NOx gases for 4 hours at a temperature of 80 degree Celsius. The flow rate of tail gas (about 10000 cubic nanometers/hour) and concentration of NOx (about 0.04% in terms of NO) were steady. The NOx treated product in the reactor was taken to ammonia gas plant wherein the effluent ammonia gas having concentration of 0.01% and having flow rate of 3000 cubic nanometers per hour, was made to react with the nitrated product for 35 minutes. The product was discharged after cooling to ambient temperature. To collect sufficient amount of treated fly ash for agricultural tests, few more runs were given keeping the conditions exactly same.

Analysis of treated & untreated fly ash for some important trace elements for the soil:

| Fly Ash | pH | Solubility in water | Zn % available to soil | Cu % available to soil | Mn % available to soil | Fe % available to soil |
| --- | --- | --- | --- | --- | --- | --- |
| Untreated | 9.6 | 0.0 | 1.00 | 0.89 | 1.54 | 4.60 |
| NOx treated | 6.3 | 4.7 | 6.70 | 1.50 | 4.30 | 10.20 |

Pot Experiment: Studies on the effect of NOx treated and untreated fly ash on the growth and vegetative yield of maize crop in Zn and Fe deficient calcareous soil.

Basal Dressing: i) 100 kg N/hec as urea
  ii) 50 kg K and 40 kg K as $KH_2PO_4$/hec Soil per pot-3 kg Variety of maize: Hybrid yellow
  Dry Yield of maize stalk/pot (gm)

| Treatment | Replication I | Replication II | Replication III | Total yield(g) | Average yield(g) | % increase over NPK | Physico-chemical property of soil used |
| --- | --- | --- | --- | --- | --- | --- | --- |
| Control | 12.0 | 13.5 | 11.0 | 36.5 | 12.1 | — | pH-9.1 |
| NPK | 16.0 | 18.5 | 20.5 | 55.0 | 18.3 | — | Texture- Sandy loan |
| Fly ash by wt. of soil + NPK | 27.0 | 26.0 | 26.5 | 79.5 | 26.5 | 44.8 | |

-continued

| Treatment | Replication I | Replication II | Replication III | Total yield(g) | Average yield(g) | % increase over NPK | Physico-chemical property of soil used |
|---|---|---|---|---|---|---|---|
| NOx treated fly ash + NPK | 40 | — | — | — | 40.0 | 118.5 | |

EXAMPLE-2

500 gms of fly ash was taken in the Stainless Steel Reactor (with mechanical device for intimate and uniform gas-solid contact and temperature and gas flow controls) which was installed near the tail gas vent line Nitric Acid Plant. made to contact with effluent NOx gases for 3 hours at a temperature of 90 degree Celsius. The flow rate of tail gas (about 10000 cubic nanometers/hour) and concentration of NOx (about 0.04% in terms of NO) were steady. The NOx treated product in the reactor was taken to ammonia gas plant wherein the effluent ammonia gas, having concentration 0.01% and flow rate of 3000 cubic nanometers per hour, was made to react with the nitrated product for 25 minutes. The product was discharged after cooling to ambient temperature. To collect sufficient amount of treated fly ash for the agricultural tests, few more runs were given keeping the conditions exactly same.

Studies on the influence of NOx treated fly ash on root nodulation and yield of Cow Pea, a leguminous crop:

Basal dressing: i) 40 kg P2O5/hac
                 ii) 50 kg K2O/hac

Soil per pot: 6 kg

Yield of cow pea (grain and straw on air dried basis (gm)

| Treatment | Replication I | Replication II | Replication III | Total (gm) | Average yield | % increase over control |
|---|---|---|---|---|---|---|
| Control | 4.5 | 4.0 | 4.5 | 13.0 | 4.3 | — |
| NOX treated fly ash | 5.6 | 6.5 | 6.5 | 18.6 | 6.1 | 44.1 |

EXAMPLE-3

500 gms of fly ash was taken in the Stainless Steel Reactor (with mechanical device for intimate and uniform gas-solid contact and temperature and gas flow controls) which was installed near the tail gas vent line Nitric Acid Plant. made to contact with effluent NOx gases for 3.5 hours at a temperature of 100 degree Celsius. The flow rate of tail gas (about 10000 cubic nanometers/hour) and concentration of NOx (about 0.04% in terms of NO) were steady. The NOx treated product in the reactor was taken to ammonia gas plant wherein the effluent ammonia gas, having concentration of 0.01% and flow rate of 3000 cubic nanometers per hour, was made to react with the nitrated product for 25 minutes. The product was discharged after cooling to ambient temperature. To collect sufficient amount of treated fly ash for the agricultural tests, few more runs were given keeping the conditions exactly same.

Effect of NOx treated fly ash on growth & yield of Paddy Variety CR 1018:

| Treatment | Plant height (cm) | No. of panicles per m2 | panicle length (cm) | Grains per panicle | 1000 grain wt. (gm) | Grain Yield t/ha | straw yield t/ha |
|---|---|---|---|---|---|---|---|
| Control | 62 | 213 | 18 | 62 | 32.5 | 1.60 | 2.4 |
| Nox treated fly ash | 73 | 465 | 20 | 87 | 33.0 | 4.43 | 7.20 |

The main advantages of the process are:

1. The process is very simple and pollution free. The unit operations involved are bare minimum.
2. The process avoids pollution of effluent gases (NOx and ammonia) by utilising for agricultural purpose.
3. The process is absolutely safe, energy efficient and cost effective.
4. By drawing effluent gases from the plants, the operations of the plants are not effected.
5. With ever increasing demand in food production due to population explosion, the process utilises all waste materials to get a valuable product, useful for food production.

The invention claimed is:

1. A process for the production of plant growth stimulator from fly ash, which comprises treating fly ash with effluent NOx gases in a reactor under agitation at a temperature in the range of 60 to 100 degrees Celsius, for a time period in the range of 2 to 5 hours, treating the resulting material with effluent ammonia gas in the same reactor under ambient conditions for time period in the range of 20 to 50 minutes.

2. A process as claimed in claim 1 wherein the NOx gases are employed in a stream having a concentration of 0.04 to 0.05% (in terms of NO).

3. A process as claimed in claim 2 wherein said concentration in maintained by mixing an NOx effluent gas stream with air.

4. A process as claimed in claim 1 wherein the ammonia is employed in a stream having a concentration of 0.01 to 0.02%.

5. A process as claimed in claim 4 wherein said concentration is maintained by mixing an ammonia gas stream with air.

6. A process as claimed in claim 2 wherein the ammonia is employed in a stream having a concentration of 0.01 to 0.02%.

7. A process as claimed in claim 6 wherein said concentration is maintained by mixing an ammonia gas stream with air.

* * * * *